United States Patent [19]

Wiehn

[11] Patent Number: 5,418,282
[45] Date of Patent: May 23, 1995

[54] METHOD OF MANUFACTURING FIRE-RESISTANT RESIN FOAM AND WOOD PARTICLE BOARDS OR SHAPED BODIES

[75] Inventor: Helmut Wiehn, Herxheim-Weyher, Germany

[73] Assignee: BHF-Chemie Brandhemmende Füllstoffe GmbH, Offenbach/Queich, Germany

[21] Appl. No.: 131,410

[22] Filed: Oct. 4, 1993

Related U.S. Application Data

[63] Continuation of Ser. No. 855,636, filed as PCT/EP90/01848, Nov. 5, 1990, published as WO91/06614, May 16, 1991, abandoned.

[30] Foreign Application Priority Data

Nov. 6, 1989 [DE] Germany ................. 39 36 886.6

[51] Int. Cl.⁶ ............................ C08K 3/28; B27K 3/52
[52] U.S. Cl. ................................. 524/735; 524/707; 524/708; 524/723; 524/405; 524/416; 524/419; 252/607; 252/608; 252/609
[58] Field of Search ............... 524/735, 707, 708, 723, 524/405, 416, 419; 252/607, 608, 609

[56] References Cited

U.S. PATENT DOCUMENTS

| | | | |
|---|---|---|---|
| 2,935,471 | 5/1960 | Aarons et al. | 524/503 |
| 4,126,473 | 11/1978 | Sobolev et al. | 252/607 |
| 4,468,495 | 8/1984 | Pearson | 252/607 |
| 4,908,160 | 3/1990 | Thacker | 252/607 |
| 5,076,969 | 12/1991 | Fox | 252/607 |

FOREIGN PATENT DOCUMENTS 0905081  2/1982  U.S.S.R. ............... 524/419

*Primary Examiner*—Paul R. Michl
*Assistant Examiner*—Olga Asinovsky
*Attorney, Agent, or Firm*—Klaus J. Bach

[57] ABSTRACT

In the manufacture of synthetic foams and also especially in that of timber materials using urea-formaldehyde condensate binders, the mol ratio between urea and formaldehyde is decisive for the resultant final rigidity and the presence of free gaseous formaldehyde. In order, with a favourable mol ratio, to reduce the quantity of gaseous formaldehyde remaining in the timber material and at the same time to obtain effective fire resistance in both synthetic foams and timber materials adhesively secured with isocyanate, the invention proposes a combination of effective substances to be added to the initial raw materials as a granulate with a grain size of 80 to 1,500 my.

9 Claims, No Drawings

METHOD OF MANUFACTURING FIRE-RESISTANT RESIN FOAM AND WOOD PARTICLE BOARDS OR SHAPED BODIES

This application is a continuation of application Ser. No. 07/855,636, filed as PCT/EP90/01848, Nov. 5, 1990, published as WO91/06614, May 16, 1991, now abandoned.

BACKGROUND OF THE INVENTION

The invention relates to an additive suitable in the manufacture of synthetic foam and in the manufacture of pressed wood boards or molded wood parts for a reduction of formaldehyde emission as well as for fire protection which additive is mixed with the base materials, that is, wood fibers or wood particles or other available lignocellular materials to which urea formaldehyde condensate or isocyanate glues are applied and which are then spread and then compressed in a hot press.

During the manufacture of fiber boards of medium density (MDF boards) as well as wood particle boards including flat-pressed boards as well as extrusion pressed boards or molded bodies, curable synthetic resin glues are used as adhesives, particularly urea formaldehyde condensates as well as melamine formaldehyde condensates. These synthetic resin glues are supplied as colloidal solutions which have dispersed therein particles of a size of 1/100,000 mm to 1/10,000,000 mm. Such a solution, termed a brine, contains, in addition to the solvent water, also urea or respectively, melamine formaldehyde condensates in which, however, the polycondensation reaction was interrupted. This interrupted polycondensation reaction is resumed during hot pressing of the particle boards while, at the same time, water is physically removed from the glue connections. The course and the speed of the chemical reaction of the glue particles, especially with urea formaldehyde condensate, are highly dependent on the pH-value. Adjustment of the pH value is performed by addition of a hardener providing for the needed acidic environment.

Besides the addition of hardener which is generally not necessary for melamine urea formaldehyde condensates, the chemical reaction of the condensate partner depends on the Mol ratio, which in connection with urea formaldehyde condensates should be about 1:2 (urea:formaldehyde) in order to achieve rapid condensation of the partners. Under such conditions, with careful maintenance of the desired Mol ratio, the temperature, time and pH value condition, first monomethylol and dimenthylol will form and then, by condensation with one another or with urea mixtures of condensation, products with ether connections or methylene connections are formed. Out of these still water soluble compounds branched and finally cross-linked condensates are formed during the reaction progressing under the heat application. In the water unsoluble cured urea formaldehyde condensation, the urea molecules are polymerized in a three-dimensional lattice structure which provides for high binding forces.

The above-indicated Mol ratio of 1:2 has the disadvantage that, after manufacturing of the panels, there is still free formaldehyde which is released slowly to the environment. This gas has a stinging odor which does not only detract from the use value of the boards manufactured from wooden material, in this manner, but if inhaled it can also cause poisoning. In order to at least limit the amount of formaldehyde remaining in the panel it was practice so far to reduce the Mol ratio down to a value of 1:1.08. With such a Mol ratio, only a very small amount of free formaldehyde remains in practice but such as small formaldehyde component amount in the urea formaldehyde resin glue does not only slow down the polycondensation process but also the formation of the above-referred to three-dimensional lattice structure and the strength of the glue. In practice one tries therefore to achieve a Mol ratio of 1:1.3 with which the amount of the free formaldehyde remaining in the particle board and slowly released therefrom can still be tolerated and which still provides for satisfactory strength. Further possibilities for the reduction of formaldehyde release which however are not or only to a small degree utilized in the industry are found for example in patent publications DOS 34 43 002 and 37 33 630 and EP-B 150 420.

It is accordingly the first object of the present invention to provide a procedure by which the amount of the formaldehyde remaining in wood material in spite of good manufacturing processes with mole ratios of 1:1.3 or higher and a correspondingly high strength of the final product may be minimized to such a degree that any formaldehyde release will no longer have any effects on the environment. Of course, this is not a problem for materials glued with isocyanate nor for resin foam materials.

For a large part of particle board applications as well as resin foam material applications, fire retardant or fire proofing provisions would be very suitable. Fire retardant particle boards in accordance with existing standards such as CSE RF 3/77, Class I for Italy, NFP 92/501M1 for France, BS 476, Part 7 Class 1 and BS 476, Part 6 Class 0 for Great Britain and DIN 4102 B1 for Germany, wherein fire protection is achieved by the addition of fire retardant materials, are basically known. In this connection reference is made to European patent application 03 51 670, EP-B 01 64 555 or German Patents 28 31 633 and 33 46 908. The fire extinguishing materials described therein are present in these cases almost exclusively in the form of salts, i.e., bromine and bromates, boron and borates, phosphates, sulfates and similar. These salts are commercially available in powder form with a powder particle size of maximally 50 my. All these methods and applications however are very uneconomical and reduce the strength of the finished product to some extent if they provide for some noticeable fire protection.

It is therefore the second object of the invention to provide a suitable fire protection compound which, as a result of its effective compound combination provides for effective fire protection but which does not adversely affect the properties of the resin material foams or those of the respective wood materials, especially not the gluing of the materials or their strength.

SUMMARY OF THE INVENTION

Both objects are solved by a material additive which is characterized by an effective compound combination present in granular form having a particle size of 80 $\mu$ to 1500 $\mu$ and comprising 5 to 90 wt. % of a partial combination A
  2 to 65 wt. % of a partial combination B
  1 to 65 wt. % of a partial combination C, and
  0 to 80 wt. % of a partial combination D
wherein the partial combination A comprises
  5 to 100 wt. % monoammoniumdihydrogen phosphate,
  0 to 85 wt. % boric acid, 0 to 25 wt. % ammonium borate,
the partial combination B comprises
- 1 to 100 wt. % diammoniumhydrogen phosphate,
- 0 to 90 wt. % sodiumtetraborate (deca-and/or pentahydrate)

the partial combination C comprises
- 0 to 35 wt. % ammoniumcarbonate,
- 1 to 100 wt. % ammoniumsulfate,
- 0 to 17.5 wt. % ammoniumamidosulfonate, and the partial combination D comprises
- 0 to 60 wt. % melamine
- 0 to 25 wt. % dimelamine phosphate
- 1 to 100 wt. % urea
- 0 to 100 wt. % aluminum(III)hydroxide, and
- 0 to 15 wt. % guanidine phosphate.

Tests have shown that both objects of the present invention are indeed achieved in an excellent and economical manner. As a result, for reducing formaldehyde release, the mole ratio urea:formaldehyde is no longer reduced so that strength and chemical reaction are no longer impaired, but a favorable mole ratio between these two reaction components is maintained while care is taken however, that, after the chemical reaction, that is, after curing of the glue, the still available free formaldehyde is captured, that is, it is bound by the material additive. It is important in this connection that, in accordance with the invention, the material additive is admixed in granular form with coarse particle size such that the material additive, as a result of its relatively small surface relative to its volume, is heated up in a delayed manner so that it enters a reaction with the formaldehyde noticeably delayed, This provides for two overlapping press phases for the wood material, a first phase at the beginning of the hot pressing step wherein the finely disposed urea-formaldehyde precondensates condense to a lattice structure under the influence of heat and second phase, wherein condensation of the material additives with the still available formaldehyde takes place without impairment for the gluing effect, after the relatively coarse particles are heated. Tests have shown that chip panels manufactured in this manner are practically free of formaldehyde gases and yet have extraordinarily high strength.

It is particularly the combination of the listed materials which provides for the elimination of formaldehyde release. This result is achieved especially by the nitrogen containing components of the material additives which react with the formaldehyde in an urea-like fashion.

In addition the combination of effective ingredients provides for excellent fire protection wherein the combination can be so selected that either fire protection or elimination of the free formaldehyde is the primary concern. Generally, three effective areas may be addressed:
- reduction of formaldehyde release with relatively small fire protection component portion,
- reduction of formaldehyde release with large fire protection component portion, and
- solely fire protection component portion as for example with synthetic resin foams and with isocyanate glued wood chip materials.

In the first case in which reduction of formaldehyde release is the primary concern, 2% to 25% of the material additives according to the invention, in relation to the solid resin amount, should be admixed; in the two other cases 8 wt. % to 18 wt. % based on the weight of the finished synthetic resin or wood chip material should be used. For special materials higher amounts may be added.

The substances of the effective material combinations are usually present in the form of powder with a particle size which is substantially less than 80 my. In order to obtain the desired particle size and to achieve intense mixing of the various components it is proposed in accordance with the invention that the base material powders of the effective material components are mixed in a dry state, and dry-compacted under pressure and then crushed. Instead of this inexpensive compacting procedure the components can be pellitized to a desired particle size by means of a water non-soluble binder which, however, does not impair the strength of the glue bonds. But also water soluble binders such as water soluble polymers added in the appropriate consistency, viscosity and amounts may be used. Independent of the way of manufacture of the granulates it is always advantageous to screen the granulates, on one hand in order to adapt them to equipment and machinery utilized and, on the other hand, to achieve the effects as claimed for the material additives according to the invention which is elimination of the free formaldehyde and good fire protection.

Another possibility for providing material additives in a delayed manner for reaction with the free formaldehyde is achieved by coating the material additives which are present in granular or crystalline form. In this case, the material additive granules are surrounded with a water soluble coat which reacts at higher temperatures but which initially prevents reaction with the formaldehyde. Only during hot pressing is this coat dissolved either under the influence of steam or heat so that the material additive granules are freed and capable of reacting with the formaldehyde. As coating material water soluble polymers (glue) may be used or paraffins which melt away at higher temperatures.

Admixture of the effective material additive combination according to the invention to the base materials for the wooden construction materials may occur before, during or after the glue addition or immediately before the spreading of the wood particles to which the glue was already applied. In accordance with the invention it is also possible to add the effective material combination via the glue. Since according to experience admixture is without problems, admixture may occur in the glue applying machinery or by injection into the material mixture or into a dry fiber lattice structure if MHD-wood construction materials are concerned.

The use of the material additive combination as addition to wood construction materials is explained by the following examples:

1. Material additive with an effective material combination which inhibits especially the release of formaldehyde (Formaldehyde Inhibiting Filler=FIF), consisting of:
   - A. 7.5 wt. % monoammoniumdihydrogen phosphate
   - B. 5.0 wt. % diammoniumhydrogen phosphate
   - C. 2.5 wt. % ammoniumamidosulfonate 33.5 wt. % ammoniumsulfate
   - D. 45.0 wt. % urea 1.5 wt. % dimelamine phosphate 5.0 wt. % melamine.

The fine powdery components were thoroughly mixed, compacted, crushed and screened for a granule size range of between 100 $\mu$ and 1200 $\mu$. The granular material was added to the wood material at the inlet of a glue application mixer in a dosed manner. The table below presents the test parameters and results of a wood particle board manufactured in this manner and, for comparison, of a panel manufactured without the material additives.

|  | Board With Material Additives | Board Without Material Additives |
|---|---|---|
| Thickness [mm] | 19 | 19 |
| Raw density [kg/m³] | 675 | 665 |
| Type of glue | UF | UF |
| Solid resin addition [% on absolutely dry wood] | 10.0 | 10.0 |
| Amount on effective material (FHF) [% on absolutely dry wood] | 0.52 | — |
| Lateral tension [N/mm²] | 0.43 | 0.42 |
| Swelling in 2 hrs [%] | 5.7 | 5.7 |
| Swelling in 24 hrs [%] | 18 | 16 |
| Moisture [%] | 5.7 | 5.6 |
| Perforator (photom.) [mg HCHO/100 g atro panel] | 6.7 | 12.8 |

2. Material additives for the manufacture of wood particle boards with fire retardant and formaldehyde emission inhibiting properties (Fire Inhibiting Filler=BHF), consisting of an effective material combination of:
A. 79.0 wt. % monoammoniumdihydrogen phosphate
B. 9.0 wt. % diammoniumhydrogen phosphate
C. 6.5 wt. % ammoniumsulfate
D. 4.0 wt. % urea 1.0 wt. % guanidine phosphate 0.5 wt. % dimelamine phosphate
are treated like in the first example and screened for a granule size of between 100 μ and 800 μ. The BHF granulate so obtained was added to the wood at the inlet of the glue admixing machinery. Again the table below presents the test parameters and results in comparison with a board manufactured without the material additives.

|  | Board With Material Additives | Board Without Material Additives |
|---|---|---|
| Thickness [mm] | 22 | 22 |
| Raw density [kg/m³] | 692 | 654 |
| Type of glue | MUF | MUF |
| Solid resin addition [% of atro wood] | 10.9 | 10.8 |
| Amount of effective material (BHF) [% of atro wood] | 19.5 | — |
| Lateral tension [N/mm²] | 0.49 | 0.55 |
| Swelling in 2 hrs [%] | 4.9 | 2.6 |
| Swelling in 24 hrs [%] | 14.7 | 8.9 |
| Moisture [%] | 7.1 | 6.6 |
| Perforator (photom.) [mg HCHO/100 g absolutely dry board] | 2.4 | 19.7 |
| Fire chamber test acc. to B1 DIN 4104 max |  |  |
| Combination gas temperature [°C.] | 124 | >200 |
| Remaining length [cm] | 23 | 0 |

Comparable values were obtained for panels glued with isocyanate glue.

3. Material additives for the manufacture of wood particle boards with fire resistant and formaldehyde emission inhibiting properties (Fire Resistance Filler=BHF) consisting of an effective material combination of:
A. 15.5 wt. % monoammoniumdihydrogen phosphate 25.0 wt. % boric acid
B. 42.5 wt. % sodiumtetraborate (pentahydrate) 2.0 wt. % diammoniumhydrogen phosphate
C. 2.5 wt. % ammoniumsulfate 1.5 wt. % ammoniumcarbonate
D. 9.0 wt. % urea 2.0 wt. % melamine in fine powder form are intensely mixed, are pelletized with methylcellulose on a pelletizing table and subsequently screened into a granulate of a particle size between 200 μ and 600 μ. 73 kg of these granulates were stirred into a bath of 100 kg raw glue (MUF), 65% solid resin) wherein settling was prevented by strong mixing. Glue from this bath was applied to the wood chips by a somewhat widened glue nozzle and the wood chips were then handled in the usual manner. During a fire test according to the Italian standard CSE RF 3/77 the boards so obtained achieved class I with substantially reduced formaldehyde release.

What is claimed is:

1. A method of manufacturing fire resistant resin foam and wood particle boards and shaped bodies from ligno-cellulose materials to which urea formaldehyde condensate and isocyanate binder glue additives are admixed before pressing thereof in a hot press, wherein said additives as powders in combination of 5 to 90 wt. % of a part combination A,
2 to 65 wt. % of a part combination B,
1 to 65 wt. % of a part combination C, and
0 to 80 wt. % of a part combination D,
the part combination A consisting of
5 to 100 wt. % monoammoniumdihydrogen phosphate,
0 to 85 wt. % boric acid,
0 to 25 wt. % ammoniumborate,
the part combination B consisting of
1 to 100 wt. % diammoniumhydrogen phosphate
0 to 90 wt. % sodiumtetraborate (deca-and/or pentahydrate),
the part combination C consisting of
0 to 35 wt. % ammoniumcarbonate,
1 to 100 wt. % ammoniumsulfate,
0 to 17.5 wt. % ammoniumamidosulfonate, and
the part combination D consisting of
0 to 60 wt. % melamine,
0 to 25 wt. % dimelamine phosphate,
1 to 100 wt. % urea,
0 to 100 wt. % aluminum(III)hydroxide, and
0 to 15 wt. % guanidine phosphate,
are mixed in selected combinations and are then pelletized so as to provide pellets of grain sizes of 80 to 1500 μ of which each includes the selected additive combination and the pellets are then admixed to the material from which said boards or bodies are formed so as to provide for even distribution of said additives throughout said material without the generation of dust, said pellets being large enough to provide for a delayed heating up of their centers in said hot press so as to provide for a delayed formaldehyde reaction for binding the still available formaldehyde.

2. A method according to claim 1, wherein said additive powders are first dry-mixed in the desired combination and compacted under pressure and then crushed to provide said pellets.

3. Method according to claim 1, wherein admixing takes place in a glue application machinery.

4. Method according to claim 1, wherein admixing is achieved by injection into the material mixture.

5. Method according to claim 1, wherein admixing is achieved by injection into a dry fiber lattice structure.

6. A method according to claim 1, wherein the granulized or pelletized particles are provided with a water soluble coating.

7. A method according to claim 6, wherein said coating consists of water soluble glue.

8. A method according to claim 1, wherein the granulized or pelletized particles are provided with a coating which melts under the influence of temperature.

9. A method according to claim 6, wherein said coating consists of a paraffin.

* * * * *